US011618139B2

(12) United States Patent
Vornweg

(10) Patent No.: US 11,618,139 B2
(45) Date of Patent: Apr. 4, 2023

(54) MULTIPLEX BOLTING TOOL

(71) Applicant: Heico Befestigungstechnik GmbH, Ense-Niederense (DE)

(72) Inventor: Stefan Vornweg, Ense-Niederense (DE)

(73) Assignee: HEICO BEFESTIGUNGSTECHNIK GMBH, Enseniederense (DE)

( * ) Notice: Subject to any disclaimer, the term of this patent is extended or adjusted under 35 U.S.C. 154(b) by 510 days.

(21) Appl. No.: 16/963,120

(22) PCT Filed: Feb. 23, 2018

(86) PCT No.: PCT/EP2018/054509
§ 371 (c)(1),
(2) Date: Jul. 17, 2020

(87) PCT Pub. No.: WO2019/161910
PCT Pub. Date: Aug. 29, 2019

(65) Prior Publication Data
US 2021/0046627 A1 Feb. 18, 2021

(51) Int. Cl.
*B25B 23/14* (2006.01)
*B23P 19/06* (2006.01)
*B25B 21/00* (2006.01)

(52) U.S. Cl.
CPC .......... *B25B 23/141* (2013.01); *B25B 21/005* (2013.01); *B23P 19/069* (2013.01); *B25B 21/002* (2013.01); *B25D 2250/165* (2013.01)

(58) Field of Classification Search
CPC ....... B25B 13/48; B25B 23/14; B25B 23/141; B25B 23/147; B25B 23/0078;
(Continued)

(56) References Cited

U.S. PATENT DOCUMENTS 2,069,882 A * 2/1937 Hall ...................... B23P 19/069
81/477
7,146,880 B1 12/2006 Francis et al.
(Continued)

FOREIGN PATENT DOCUMENTS

DE     10236585 A1   2/2004
EP      2233249 A1   9/2010
(Continued)

OTHER PUBLICATIONS

International Search Report dated Aug. 29, 2019 in parent International application PCT/EP2018/054509.
(Continued)

*Primary Examiner* — Robert J Scruggs
(74) *Attorney, Agent, or Firm* — Polson Intellectual Property Law, PC; Margaret Polson; Christopher Sylvain

(57) ABSTRACT

A torque wrench for multiple bolts or nuts comprises multiple drive spindles that are arranged annularly around a center and are equipped or able to be equipped at the end with respective torque-applying tools, and a ratchet drive, associated with each drive spindle and driven by means of a hydraulic piston drive, for driving the drive spindles. The torque wrench for multiple bolts or nuts also comprises an actuator unit for inducing a rotary movement in the drive spindles, having an actuating wheel mounted rotatably about the axis of the center of the annular arrangement of the drive spindles as drive wheel, which drives respective output wheels fitted on the drive spindles, wherein the driving movement of the actuating wheel is transmitted to the drive spindle via respective torque limiters.

26 Claims, 4 Drawing Sheets

(58) Field of Classification Search
CPC ..... B25B 21/00; B25B 21/005; B25B 21/002; B23P 19/065; B23P 19/069; B25D 2250/165
See application file for complete search history.

(56) References Cited

U.S. PATENT DOCUMENTS

| | | | |
|---|---|---|---|
| 8,464,644 B2 | 6/2013 | Fujimoto | |
| 9,657,593 B2 | 5/2017 | Todorovic | |
| 10,525,562 B2 | 1/2020 | Tachiki | |
| 2007/0074606 A1 | 4/2007 | Halse | |
| 2010/0025046 A1* | 2/2010 | Francis | E21B 17/085 166/380 |
| 2010/0199812 A1 | 8/2010 | Richardson | |
| 2014/0165790 A1* | 6/2014 | Neiss | B25B 23/1456 81/57.39 |
| 2014/0245869 A1* | 9/2014 | Rice | B23P 19/069 81/473 |
| 2016/0312550 A1 | 10/2016 | Jonassen | |

FOREIGN PATENT DOCUMENTS

| | | |
|---|---|---|
| FR | 3012189 A1 | 4/2015 |
| WO | 2009135201 A2 | 11/2009 |
| WO | 2010124150 A2 | 10/2010 |

OTHER PUBLICATIONS

Written Opinion of the International Searching Authority dated Aug. 29, 2019 in parent International application PCT/EP2018/054509.
Pending U.S. Appl. No. 16/970,058, filed Aug. 7, 2020 Per rule 609.07.
Pending U.S. Appl. No. 16/968,405, filed Aug. 14, 2020 Per rule 609.07.

* cited by examiner

MULTIPLEX BOLTING TOOL

BACKGROUND

The present disclosure relates to a multiplex bolting tool, also called a torque wrench for multiple bolts or nuts with multiple drive spindles that are arranged around a center and are equipped or able to be equipped at the end with respective torque-applying tools, and a ratchet drive, associated with each drive spindle and driven by means of a hydraulic piston drive, for driving the drive spindles.

Torque wrenches for multiple bolts or nuts serve the purpose of applying torque to a plurality of screw connections in a single screwing process and thus, for example, tightening or loosening bolts, which are arranged in a ring arrangement. Simultaneously applying torque to a plurality of screw connections shortens the time otherwise required for applying torque to several screw connections. Furthermore, when applying torque to individual screw connections, which are arranged annularly around a center, care must be taken to ensure that the components to be bolted together do not tilt relative to each other, which is why the screw connections must be tightened according to a pre-defined screwing pattern. If this is not adhered to, there is a risk that a joint consisting of several bolted connections will not be fastened properly.

Torque wrenches for multiple bolts or nuts are used for connecting risers in oil or water wells, for example. At their ends, these pipes have connecting flanges protruding outward in the radial direction. To connect two such pipes, the adjacent connecting flanges are bolted together with several screw connections. A torque wrench for multiple bolts or nuts suitable for this purpose is known from EP 2 288 476 B1. With this previously known torque wrench for multiple bolts or nuts, a number of torque-applying devices corresponding to the number of screws to be tightened or loosened is provided, for example six torque stations. The torque stations are arranged around a center. This previously known torque-applying device is designed in an annular shape and leaves a central opening through which the pipes with their flanges can be pulled. Each torque station is displaceable in the radial direction, such that it can be adjusted from a non-operating position, in which a riser with its flange can be passed through a central opening of the torque wrench for multiple bolts or nuts, into an operating position for applying torque to the screw bolts. In order to apply torque to the screw connections of two adjacent connecting flanges of second risers, the torque stations are displaced in the radial direction to their operating position. Each torque station has a drive spindle, which drives a socket as a torque-applying tool. The socket has an inner contour, which is complementary to the outer contour of the head of a screw bolt that is meant to be tightened or loosened by means of the torque station.

Each drive spindle is driven by its own hydraulically operated ratchet drive. For this purpose, the piston rod of a hydraulically actuated piston is connected to the ratchet lever of the ratchet drive. The ratchet lever has a pawl, which drives a drive spindle that is rotatably supported in the ratchet lever. The drive spindle has a square opening, into which the square drive, which has a complementary geometry to one end of a socket as a torque-applying tool, can be inserted. The pawl is under spring preload and interacts with the outer splines of the drive spindle under the spring preload. With a forward stroke of the piston rod, the drive spindle is advanced by at least one tooth, proportional to the executed stroke, relative to the pawl. With the return stroke, the ratchet lever is returned to its initial position, while the bolt does not turn back. This alternation between the forward and return stroke is carried out until the bolt is tightened with the intended torque.

In such torque wrenches for multiple bolts or nuts, it is sometimes difficult for the torque-applying tools located on the torque wrench for multiple bolts or nuts to mate their inner contour to the outer contour of the parts of a screw connection to be driven, for example the head of a screw bolt. In such a torque wrench for multiple bolts or nuts, the torque-applying tools are typically pre-positioned with respect to their rotational position and with respect to their contour to match the parts of the screw connections to be driven. In addition, the individual screw connections of such a joint with multiple bolts should be tightened with the same torque. In the case of screw connections, which are to be tightened with a high torque, e.g., 200 Nm or more, this cannot be realized with simple, reasonable means via torque-limiting slip couplings installed in the individual ratchet drives, especially since such a ratchet drive would be prone to wear.

SUMMARY

Proceeding from this background, an aspect of the present disclosure is to further develop a torque wrench for multiple bolts or nuts in such a way that it is possible, in a simple manner and before tightening or loosening the bolt, to mate the complementary contours between torque tool and the part of the screw connection to be driven, and also to tighten the screw connection, even with high torques, without installing torque limiters in each individual ratchet drive.

According to the present disclosure, this aspect is provided by a generic torque wrench for multiple bolts or nuts of the type mentioned at the onset, in which the torque wrench for multiple bolts or nuts comprises an actuator unit for inducing a rotary movement in the drive spindles, having an actuating wheel mounted rotatably about the axis of the center of the annular arrangement of the drive spindles as drive wheel, which drives respective output wheels fitted on the drive spindles, wherein the driving movement of the actuating wheel is transmitted to the drive spindle via respective torque limiters.

This torque wrench for multiple bolts or nuts has an actuator unit, which is actuated before the actual tightening or loosening process begins. The drive spindles can be moved with this actuator unit. For this purpose, the actuator unit has an actuating wheel, which is mounted rotatably about the axis of the center of the annular drive spindles. This actuating wheel is a drive wheel and drives respective output wheels that are seated on the drive spindles. In this manner, a driving movement of the actuating wheel can be transferred to the drive spindles. A particular property of the actuator unit is that the transfer of the driving movement of the actuator wheel to the drive spindles is performed by means of respective torque limiters. The purpose of these is to ensure that the screw connections to be tightened can be tightened with equal torque by means of the actuator unit on a first pass. The actuating wheel can be operated manually, for example with a ratchet as a drive tool or with an electric screw tool. Of course, it can also be operated hydraulically or pneumatically. The torque introduced into the actuating wheel is limited. Due to the rotational movement of the actuator wheel and the resulting rotational movement of the drive spindles at the torque transmitted via the slip couplings, the torque-applying tools seated on the drive ends of the drive spindles are rotated. The torque-applying tools are typically spring-loaded torque-applying tools, which can be adjusted in the longitudinal axial direction by a certain amount against the force of a return spring on the drive spindle. If, when actuating the actuator device, the torque-applying tool for multiple bolts and nuts is held against the fastening elements, for example, the bolts, the torque-applying tools executed in this embodiment as sockets snap onto the bolt heads when their respective, complementary contours are aligned with each other. Thus, by operating the actuator unit with a low, in particular manually transferred, torque, the torque-applying tools can easily mate to the respective complementary contours of a fastening element and thus engage with them.

The torque limitation in the transfer of torque from the actuating wheel to the drive spindles serves the purpose that the fastening elements—for example, the bolts—driven by the drive spindles via their torque-applying tools, are tightened until the slip coupling engages and a transfer of further torque to a drive spindle is no longer performed. The torque limiters of the individual drive spindles, which are designed as a slip coupling, are set up in such a way that the torque limitation applies to each drive spindle at the same torque. In this manner, differently tightened fastening elements can be put into a preload position, in which they are all tightened with the same preload. The subsequent operation of the multi-tool for tightening the screw connections by means of the ratchet drives thus starts out from the same preload with regards to all screw connections to be tightened. This preload does not need to be particularly high. It merely serves the purpose of ensuring that the screwing process begins from the same starting point for all screw connections with respect to the preload applied. It is then possible to drive the drive spindles by means of the ratchet drives to achieve a uniform tightening torque without a mechanical torque limiter installed onto the ratchet drives. The torque to be applied to the drive spindles is then solely dependent on the hydraulic fluid pressure provided, with which the ratchet drives are driven. As the hydraulic fluid pressure is identical in all actuator cylinders used to drive the ratchet drives, the maximum torque to be induced to the individual drive spindles also is identical.

In one example embodiment, it is provided that, to realize the respective torque limiter assigned to each drive spindle, the output wheel meshes with the splines of the actuating wheel by means of outer splines, while said output wheel on its inner side fits closely against two coupling discs under a preload defining the torque limit. According to one possible design, the coupling discs are inclined to each other with their coupling surfaces, whereby an output wheel accommodation is provided. The incline can be linear or curved, as provided in one example embodiment. The inner contour of the output wheel is complementary to the cross-sectional contour of the coupling surfaces. The preload typically is provided by at least one compression spring acting on a coupling disc, while the other coupling disc is supported on a thrust bearing. If desired, it may be provided that the preload acting on the coupling discs is adjustable. As a rule, this will not be necessary, since the torque transferred by means of the actuator unit for driving the drive spindles is not the important factor for tightening the screw connections. Rather, it is essential that the torque limit is identical for all drive spindles when driving the drive spindles by means of the actuator unit.

Preferably, the actuator unit is a module of the torque wrench for multiple bolts or nuts, and can be detachably connected to a drive block containing the ratchet drives. In such an embodiment of the torque wrench for multiple bolts or nuts, the components of the actuator unit can be located in a housing comprising an upper and a lower part.

In a preferred example embodiment of the modular design of the actuator unit of the torque wrench for multiple bolts or nuts, the drive spindles are supported and held in a drive block, which contains the ratchet drives, and protrude from the same on both sides with respective drive sections. The torque-applying tools are mounted on the drive sections of the drive spindles protruding from one side. The actuator unit, then, is connected to the other side of the drive block in such a design and acts on the other drive sections. The torque-applying tools typically are detachably connected to the drive spindle, as is the actuator unit. In this respect, this torque wrench for multiple bolts or nuts can be switched from a tightening operation to a loosening operation, by removing the torque-applying tools from one set of drive sections of the drive spindles, and removing the actuator unit from the other drive sections of the drive spindles, and then connecting said components to the drive sections on the respective other side.

In a further development of such a torque wrench for multiple bolts or nuts, it is provided that, in addition to the ratchet drive, a locking ratchet for locking the drive spindle acts on each drive spindle to keep it from turning back when performing a return stroke movement of the drive ratchet, which locking ratchets are arranged in a locking bracket penetrated by the drive spindles, and that the locking bracket has means for loosening the locking ratchets.

In this torque wrench for multiple bolts or nuts, a locking ratchet acts on each drive spindle, in addition to the ratchet drive. The ratchet of the ratchet drive, as well as the locking ratchet, respectively act on the drive spindle in the same direction. Both the pawl of the ratchet drive and the locking pawl of the locking ratchet are in engagement with outer splines of the drive spindle. The pawl of the ratchet drive and the locking pawl of the locking ratchet engage with the teeth of the drive spindle in equal measure. This means that, when performing a return stroke of the ratchet lever of the ratchet drive, the locking ratchet prevents the drive spindle from springing back, for example due to a previously induced torsional force of the drive spindle. The locking ratchets of this torque wrench for multiple bolts or nuts are arranged in a locking bracket, which is penetrated by the drive spindles. The locking bracket thus follows the arrangement of the drive spindles arranged around a center. Typically, the locking bracket is annular. However, an embodiment in which it only extends across a circular segment also is possible. Even in such an embodiment, the drive spindles are arranged around a center, however, not in a ring structure but only in a circular segment structure. Providing a locking bracket in which the locking ratchets are arranged makes it possible that said locking bracket has means for loosening the locking ratchets. With these means, the locking pawls can be moved out of their position engaging with outer splines of the drive spindle. For this purpose, the locking pawls are typically held in the locking bracket translationally against the force of a return spring, against which spring force the locking pawls are moved out of their locking position, in which their hooks engage with outer splines of the drive spindle. The guiding of a locking pawl within the locking bracket typically is provided by the walls of the locking chamber inside which such a locking pawl is mounted. Such a locking chamber represents an expansion in the radial direction to a drive spindle opening.

BRIEF DESCRIPTION OF THE DRAWINGS

In the following, the present disclosure is described on the basis of an example embodiment with reference to the attached drawings, wherein.

DETAILED DESCRIPTION

Figure 1:
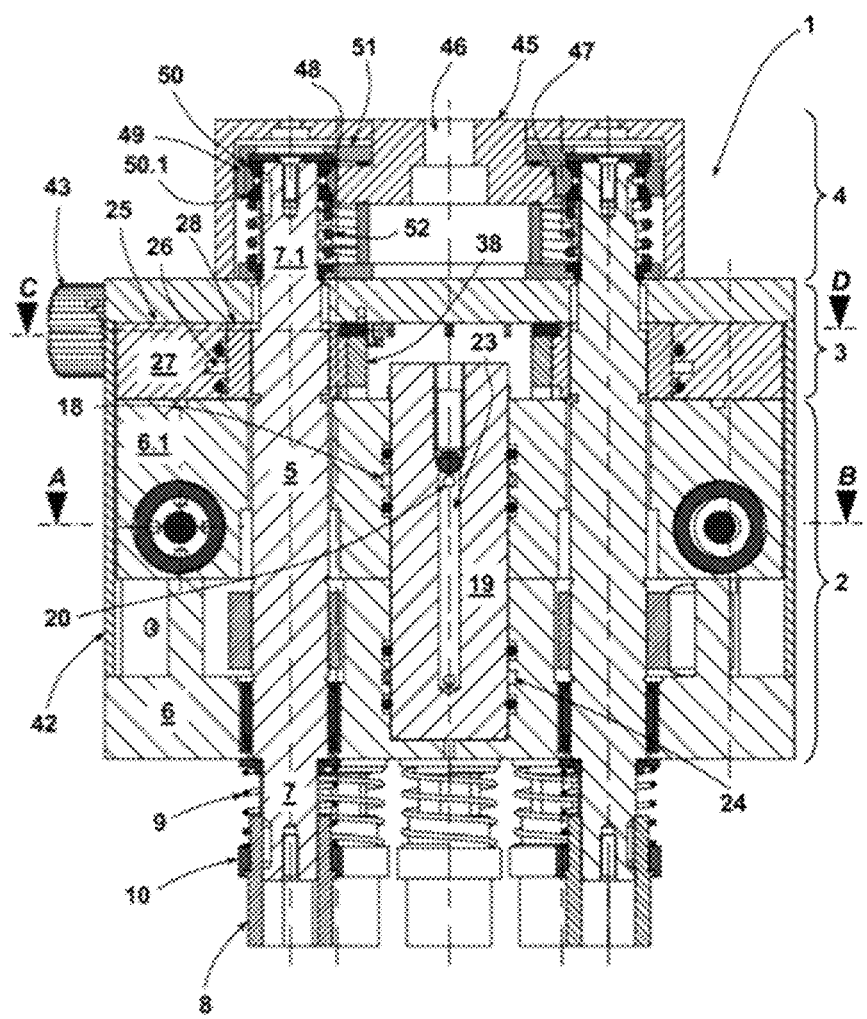
FIG. 1 shows a longitudinal-section view through a torque wrench for multiple bolts or nuts.

In the example embodiment shown in the drawings, a torque wrench for multiple bolts or nuts 1 is of a modular design and comprises a drive block 2 as the first module, a locking unit 3 as the second module, and an actuator unit 4 as the third module. The individual modules 2, 3, 4 are explained below. Even if, within the context of these explanations, these are combined for forming the torque wrench for multiple bolts or nuts 1, the individual modules 2, 3, 4 can also be used independently of each other together with differently designed components of a torque wrench for multiple bolts or nuts. For example, the functionality achieved with the locking unit 3 can also be combined in connection with another drive block or also without actuator unit or with a differently formed actuator unit. The same applies to the actuator unit 3.

The Drive Block

In the example embodiment shown here, eight drive spindles 5 are provided in the drive block 2. These are arranged annularly around a center. These are rotatably supported and held in the drive block 2. The drive block 2 has a cylindrical outer lateral surface. In the sectional representation of FIG. 1, two drive spindles 5 are shown in a sectional view, while three others, positioned behind them, are recognizable in a front view or partial view. The drive spindle 5 shown on the left in FIG. 1 and its drive are described in more detail in the following. These explanations also apply equally to the other drive spindles 5, which are designed in the same way as the drive spindle and its drive described below.

In the example embodiment shown here, the drive block 2 is provided by two block discs 6, 6.1. The drive spindle 5 penetrates the block discs 6, 6.1, which are connected to each other, and protrudes from them on both ends. These sections of the drive spindle 5 protruding from the drive block 2 are referenced as drive sections 7, 7.1 in the context of these explanations. As torque-applying tool, a socket 8 having an inner contour is seated on the drive section 7 in a torque-transferring manner, which drive section 7 in FIG. 1 protrudes from the bottom of the drive block 2. The socket 8 is detachably held on the drive section 7 in a manner known per se, specifically held by a locking ring 10 pretensioned by a compression spring 9. If the locking ring 10 is moved in the direction of the drive block 2, the locking effect caused by a ball not shown in the drawing is released, such that the socket 8 can be detached from the drive section 7. The drive spindle 5 is supported in the drive block 2 by bearings, which can also have seals at their outward-facing sides, which prevent an entry of contamination into the bearings of the drive spindle 5.

Figure 2:
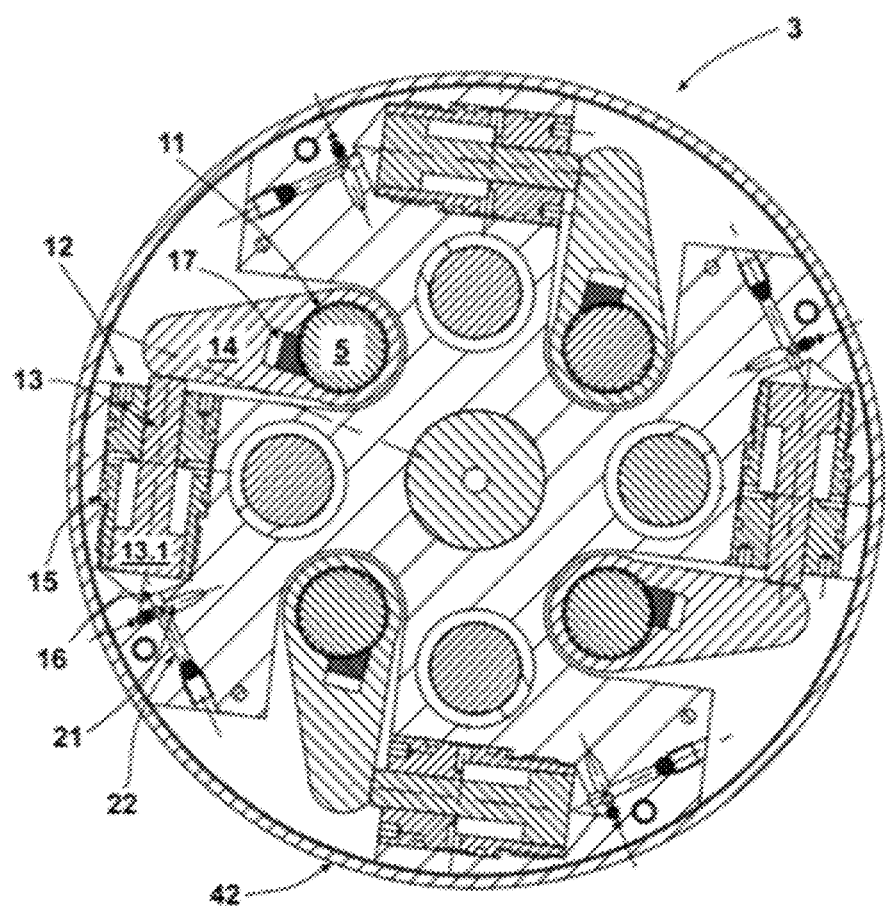
FIG. 2 shows a cross-section along line A-B of the torque wrench for multiple bolts or nuts of FIG. 1.

A ratchet drive serves for driving the drive spindle 5, as is described more clearly by means of the cross-sectional representation of FIG. 2. In the example embodiment shown here, four ratchet drives are housed in the upper block disc 6.1 and four further ratchet drives in the lower block disc 6. The respective ratchet drives for the individual drive spindles 5 are of the same design.

To provide a drive by means of such a ratchet drive, the drive spindle 5 has circumferential, asymmetrical outer splines 11 in its drive section, as is typical for ratchet drives. The longer spline flanks point in the drive direction of the drive spindle 5. The shorter spline flanks point in the opposite rotational direction. The ratchet drive comprises a piston-cylinder arrangement 12, the piston rod 13 of which acts on a ratchet lever 14. A piston 13.1 supporting the piston rod 13 is located in a cylinder housing provided by a screw-in cylinder 15. The cylinder housing 15 has two fluid connectors, of which a fluid connector 16 is visible in the sectional view of FIG. 2. This fluid connector 16 opens into the bottom area of a hole drilled in the drive block 2, which receives the screw-in cylinder 15. Hydraulic fluid is fed into the cylinder housing 15 via the fluid connector 16 for moving the piston 13.1 with its piston rod 13 to perform a forward stroke. The hydraulic connector for the return stroke opens radially into the screw-in cylinder 15 at the side of the piston 13.1 opposite to the fluid connector 16. The piston rod 13 is connected to the ratchet lever 14 in a manner transferring both compressive and tensile forces, such that a forward stroke performed by the piston leads to a forward stroke movement by the ratchet lever 14. By performing a return stroke, the ratchet lever 14 is returned to its position shown in FIG. 2. The piston 13.1 is connected to the ratchet lever 14 via a push rod as an extension of the piston rod 13. This push rod penetrates a hole in the ratchet lever 14, which extends in the direction of movement of the piston rod 13. Between the push rod and the piston rod 13 is an actuating tappet with which the piston rod 13 interacts for transferring a forward stroke movement against a bolt of the ratchet lever 14 providing the aforementioned hole that is penetrated by the push rod. The push rod penetrates the hole. A retaining disc, for example a snap ring, is located on the section of the push rod protruding from the hole, by means of which disc the ratchet lever 14 is moved along when the piston rod 13 performs a return stroke movement.

A pawl 17 is inserted in the ratchet lever 14. The teeth of the pawl 17, which is under spring preload (not shown in the drawing), engage with the outer splines 11 of the drive spindle 5. The teeth of the pawl 17 are designed to be complementary to the outer splines 11 of the drive spindle 5. During a forward stroke of the piston rod 13, which leads to a rotation to the right of the ratchet lever 14, the drive spindle 5 is moved clockwise. In the example embodiment shown here, the drive spindle is moved by one tooth when a forward stroke is performed. During a return stroke, the ratchet lever 14, along with the pawl 17, is returned in its position shown in FIG. 2, while the drive spindle 5 remains in its position into which it had been moved by the previously performed drive movement.

The drive block 2 shown in FIG. 1 shows the stacked arrangement of the ratchet drives offset at an angle in the two block discs 6, 6.1. The drive block 2 of the torque wrench for multiple bolts or nuts 1 has a first hydraulic fluid connector for feeding hydraulic fluid from a hydraulic pump for performing the forward stroke and a second hydraulic connector for feeding hydraulic fluid for performing the return stroke. These hydraulic connectors are not visible in the drawing. The hydraulic fluid connector for the forward stroke is connected to a fluid distribution cavity designed as an annular duct 18 by means of a duct extending in the radial direction. The annular duct 18 is located in the wall of a central hole located in the drive block 2. The hole is filled with a cylindrical fluid distributor 19. This distributor is crossed by transverse bores 20 at the height of the annular duct 18. On both sides of the annular duct 18, sealing rings are provided in slots for sealing the lateral surface of the fluid distributor 19. The annular duct 18 serves for supplying hydraulic fluid required for the forward stroke of the piston-cylinder arrangements 12 of the ratchet drives arranged in the block disc 6.1. Fluid ducts also open into the annular duct 18, which fluid ducts establish a connection between the annular duct 18 and the piston-cylinder arrangements 12 installed in the block disc 6.1 for the forward stroke. A small section 21 of such a line is visible in FIG. 2, as it is inclined relative to a horizontal plane. The transverse bore 22, which is adjacent to the section 21, is used to establish a fluid connection between the radial extension of the section 21 and the fluid connector 16 or the cylinder housing 15. This transverse bore 22 is closed at its end that is opposite to the screw-in cylinder 15. The aforementioned transverse bores 20 serve to also supply the piston-cylinder arrangement of the block disc 6 with hydraulic fluid for the forward stroke. Said bores open into a central fluid duct 23, through which a fluid path is established to the same plane as a second annular chamber 24 in the lower block disc 6. Four fluid ducts also open into the annular chamber 24 for establishing a fluid connection between a first fluid connector of the cylinder housings received in the block disc 6.

The piston-cylinder arrangements 12 of the drive block 2 are all designed identically. Therefore, the same amount of hydraulic fluid is required for performing a forward stroke of each piston-cylinder arrangement.

The hydraulic fluid connection for feeding hydraulic fluid for the return stroke opens into an annular fluid distributor 25 connected to the top of the block disc 6.1. The fluid distributor 25 provides another annular duct 26, into which fluid ducts (not shown in detail in the drawing) open, which fluid ducts are connected to respective backstroke fluid connectors of a screw-in cylinder 15 at their other end. While the fluid ducts for feeding hydraulic fluid to the piston-cylinder arrangements 12 largely extend in the radial direction, the fluid ducts for feeding the hydraulic fluid for performing a return stroke largely extend in the vertical direction and thus in the direction of the longitudinal extension of the drive spindles 5.

In the example embodiment shown here, the annular duct 26 is provided by two annular bodies 27, 28 arranged concentrically to each other. The geometry of the annular duct 26 is located in the inner wall of the annular body 27 located on the outer side as seen in the radial direction. The inner side of the annular duct 26, as seen in the radial direction, is closed by the outer lateral surface of the second annular body 28. Ring seals arranged adjacent to the annular channel 26 ensure the necessary tightness. The annular body 28 is penetrated by the drive spindles 5, as is visible in FIGS. 1 and 3.

The Locking Unit

In the example embodiment shown here, the inner annular body 28 at the same time represents a locking bracket. The drive spindles 5 penetrate the annular locking bracket 28. The locking bracket 28 bears respective locking ratchets 29 associated with each drive spindle 5 for locking the respective drive spindle 5 against turning back or springing back when the drive ratchet performs a return stroke movement, i.e., when the pawl with its teeth is moved away from the outer splines 11 of the drive spindle 5. Each locking ratchet 29 comprises a locking chamber 30 as an extension of the opening 31, which is penetrated by the drive spindle 5. A locking pawl 32 is located in the locking chamber 30, the teeth of which locking pawl 32 under spring-load (not shown in the drawings) engage with the outer splines 33, which also are present at this section of the drive spindle 5. The outer splines 33 and the outer splines 11 of the drive spindle 5 are asymmetrical with the same orientation and are designed with the same number of teeth. The same applies to the operational direction of the locking pawl 30 and the pawl 17. The locking ratchet 29 has the effect that the locking ratchet 29 remains in its locking position when a return stroke of the drive ratchet is performed. This makes possible an application of torque to the drive spindle 5 and thus to the torque-applying tool, designed as a socket 8 in the example embodiment shown here, and to a bolt to be tightened in such a measure that torsional force is exerted onto the bolt and/or the drive spindle 5. Due to the blocking effect of the locking ratchet 29, an otherwise unavoidable springing back of the torsion introduced into the drive spindle 5 and/or the bolt is effectively prevented when a return stroke is performed.

Figure 3:
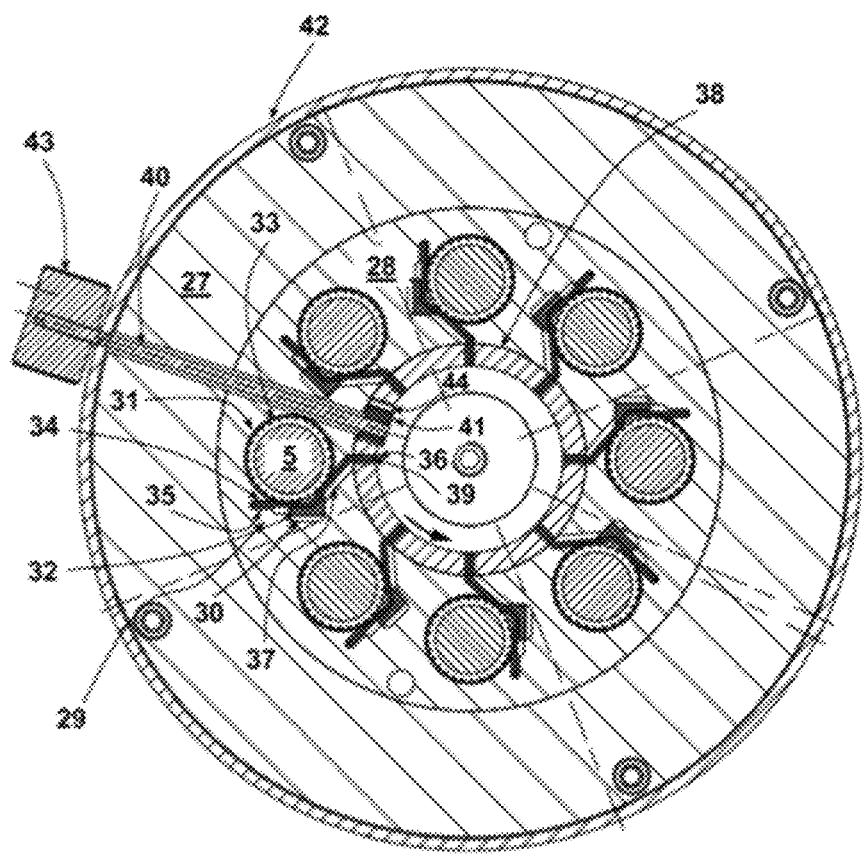
FIG. 3 shows another cross-section along the line C-D through the torque wrench for multiple bolts or nuts of FIG. 1 to represent a locking device for locking the drive spindles in a locking position.
Figure 4:
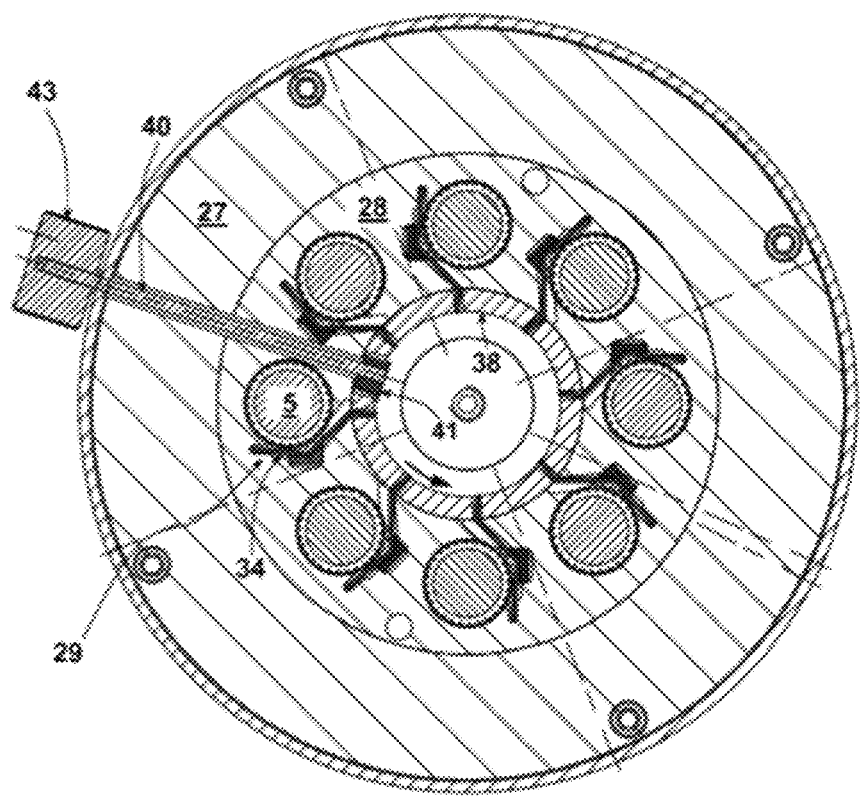
FIG. 4 shows the representation of FIG. 3 with unlocked locking devices.

The locking pawl 32 is designed T-shaped in its cross section, wherein the middle portion bears the locking teeth interacting with the outer splines 33 of the drive spindle 5. The sections adjacent to both sides each have an actuating area with which an actuating lever 34 makes contact. The actuating lever 34 serves the purpose of moving the locking pawl 29 out of the position in which its teeth engage with the outer splines 33 of the drive spindle 5, when it is to be unlocked. The actuating lever 34 is held with its radially outward end in a return lever accommodation 35 of the locking bracket 28. Although the locking lever 34 is designed as an angle, as shown in FIG. 3, it penetrates the locking bracket 28 in an essentially radial direction and with an actuating section 36 protrudes from the locking bracket 28 toward the inside, as seen in the radial direction. The actuating lever 34 is routed in an actuating lever channel 37 of the locking bracket 28. The locking channel 37 has sufficient clearance in the circumferential direction of the locking bracket 28 to allow a movement of the actuating lever 34 to move the locking pawl 29 away from the drive spindle 5, specifically move it far enough away that the engagement of teeth of the locking pawl 29 with the outer splines 33 of the drive spindle 5, which otherwise is effected by the spring load, can be released. Further inward, as seen in the radial direction, from the locking bracket 28 is an actuating ring 38, which in turn has a return lever accommodation 39 for the actuating section 36 of the actuating lever 34. The actuating ring 38 can be rotationally displaced relative to the locking bracket 28, as indicated by an arrow in FIG. 3. An actuating rod 40 serves for displacing the actuating ring 28, which rod bears an actuating cam 41 at its end portion engaging with the actuating ring 38. The actuating rod 40 is routed outward through the locking bracket 28, the outer annular body 27 and through a housing 42, and bears a handle 43 at its end protruding from the outer housing 42, via which handle 43 the actuating rod 40 can be rotated for displacing the actuating ring 38. FIG. 3 shows the locking bracket 28 with its locking ratchets 29 and the actuating ring 38 in the tightening position of the torque wrench for multiple bolts or nuts 1, in which position the locking ratchets 29 engage with the outer splines 33 of the drive spindle 5 in a manner that locks the latter.

To push back the locking pawls 30 from their position in which they engage with the outer splines 31 of the drive spindles 5, the actuating rod 40 is rotated by means of the handle by about 180 degrees. Due to the engagement of the eccentrically designed actuating cam 41 with an actuating cam recess 44 of the actuating ring 38, the actuating ring 38 is adjusted counterclockwise, whereby the actuating levers 34 fitted against the actuating areas move the locking pawls 32 away from the respective drive spindle 5. If a torsional force acts on the locking pawls 32 via the drive spindles 5 and it is not easily possible to release the locking mechanism by turning the actuating rod 40, as previously described, the piston cylinder arrangements 12 are controlled to perform a forward stroke, such that the torsional force acting on the locking pawls 32 is reduced. The torque wrench for multiple bolts or nuts 1 can then easily be removed from the tightened bolts.

The locking unit 3 thus makes it possible to tighten screw connections with a particularly high torque using the torque wrench for multiple bolts or nuts 1, in particular with such a torque at which the screw connection remains tight even when exposed to a certain torsion of the components that were fastened together.

The Actuator Unit

The actuator unit 4 acts on the drive sections 7.1 of the drive spindles 5 opposite to the torque-applying tools (see FIG. 1). The actuator unit 4 serves for inducing a rotational movement in the drive spindles 5, in order to bring the inner contour of the sockets 8 seated on the drive sections 7 into alignment with the outer contour of the individual bolts. In addition, the actuator unit 4 serves the purpose of bringing the bolts to be tightened by means of the torque wrench for multiple bolts or nuts 1 to a uniform preload before the hydraulic tightening process.

The actuator unit 4 comprises a central actuating wheel 45 with a drive contour 46 located centrically within said wheel, into which contour, for example, the square shaft of a ratchet or another manual or electrical tool can be inserted. By turning the actuating wheel 45, the drive spindles 5 can be driven via respective torque limiters. The actuating wheel 45 bears outer splines 47, which mesh with an output wheel 48 that is seated on the drive section 7.1. The output wheel 48 has corresponding, complementary teeth 49 and acts on two coupling rings 50, 50.1 with its radial inner side having two coupling surfaces. The inside of the output wheel 48 is conically tapered for this purpose and acts against complementary inclined coupling surfaces of the coupling rings 50, 51. The upper coupling ring 50 in FIG. 1 acts in the direction of the longitudinal axis of the drive spindle 5 against a counter bearing plate 51. The lower coupling ring 50.1 is under the preload of a compression spring 52 acting on it, which spring is supported on a counter bearing with its other end; through this compression spring 52, the coupling ring 50.1, via the output wheel 48, acts in the direction of the other coupling ring 50. Thus, the force transfer from the output wheel 48 to the coupling rings 50, 50.1 seated on the drive section 7.1 of the drive spindle 5 in a torque-transferring manner is limited by the compression spring 52.

As the actuating wheel 45 drives all drive spindles 5 in the same manner, a low torque suffices to bring the torque-applying tools seated on the opposite drive section 7 of the drive spindles 5 into the position required for engagement with, for example, the head of a bolt. In addition, the bolts are tightened at the same preload by the drive via the actuating wheel 45. If a screw bolt is tightened with a certain preload, the slip coupling installed on the respective drive spindle 7.1 operates as a torque limiter, such that this drive spindle 5 is not turned further by additional rotary movements of the actuating wheel 45, wherein, on the other hand, the other drive spindles, which can still transfer the torque transferred via the torque limiter, are turned further, specifically until their respective torque limiters formed by the coupling discs 50, 50.1 also are triggered. Thus, a uniform torque limitation of the torque transferred via the actuating wheel 45 to the drive spindles 5 is achieved in a simple manner.

Other Operational Devices

The torque wrench for multiple bolts or nuts 1 is associated with a hydraulic unit and a control device for controlling the hydraulic unit for its operation. The hydraulic unit includes a hydraulic pump, a fluid tank for the storage of hydraulic fluid, typically hydraulic oil, as well as a fluid pressure output for the forward stroke and another fluid pressure output for the return stroke. In addition, the hydraulic unit has a flow measurement device for detecting the hydraulic fluid quantity conveyed, which is used to detect said quantity during the operation of the hydraulic unit. According to a preferred operating method of the torque wrench for multiple bolts or nuts, the hydraulic unit is controlled dependent on fluid flow rates, based on information from its flow measurement device. This ensures that a switch from a forward stroke to a return stroke of the hydraulic actuator cylinders of the torque wrench for multiple bolts or nuts takes place only when the predefined hydraulic fluid quantity has been conveyed. This predefined hydraulic fluid flow quantity corresponds to the hydraulic fluid volume required to move the piston arranged in each hydraulic actuating cylinder from its one end position to its other end position. This ensures that a switch from a forward stroke movement to a return stroke movement takes place only when all pistons of the ratchet drives have actually been moved in equal measures. The same applies to a switch from a return stroke movement to a forward stroke movement. When the hydraulic unit is controlled in this manner, it is therefore irrelevant whether the desired stroke is carried out synchronously in all actuator cylinders or with a small time offset. In order to be able to determine the respective quantity of hydraulic fluid, the torque wrench for multiple bolts or nuts is actuated several times to perform of a stroke before it is used to actually tighten or loosen a bolt. The respective fluid volume conveyed is recorded therein. By repeating this process multiple times, a reliable reference value for the fluid volume conveyed is obtained. This fluid quantity conveyed then determines the switching time. If in such an operation of the hydraulic unit of the torque wrench for multiple bolts or nuts the hydraulic fluid flow quantity required for switching from a forward stroke movement to a return stroke movement could no longer be conveyed, because at least one of the screw connections to be tightened is already sufficiently tightened, causing the actuator cylinder not to be moved further by means of the applied hydraulic pressure, the hydraulic unit typically switches off. A further application of torque can then be carried out by manually controlling the fluid conveyance until all screw connections are tightened with the desired torque. If no more hydraulic fluid is conveyed, all screw connections are tightened with the same torque, as the hydraulic oil pressure remains constant. In this mode of operation, the force with which the screw connections are tightened is dependent on the pressure with which the hydraulic fluid is conveyed. With such a torque wrench for multiple bolts or nuts, screw connections can also be tightened with very high torques.

The operation of the hydraulic unit and thus of the torque wrench for multiple bolts or nuts can also be carried out at different pressure levels. It is possible to perform a first tightening step with only a low hydraulic pressure (a few bar). This step of tightening the bolts merely serves for the torque-applying tools to mate their contour to the complementary fastening elements to be driven, for example the head of a bolt, and that all screw connections are brought into a same initial state with respect to their fastening position. Once this is achieved, the actual tightening of the screw connections takes place. For this purpose, the hydraulic pressure of the hydraulic unit is raised to the pressure corresponding to the torque to be applied. Herein, it is entirely possible to apply pressures from 600 to 800 bar. Of course, it is also possible to provide higher pressures. The tightening process is carried out by means of the fluid control process dependent on fluid quantities conveyed, as already described above.

LIST OF REFERENCE NUMBERS

| List of reference numbers | |
|---|---|
| 1 | Torque wrench |
| 2 | Drive block |
| 3 | Locking unit |
| 4 | Actuator unit |
| 5 | Drive spindle |
| 6, 6.1 | Block disc |
| 7, 7.1 | Drive section |
| 8 | Socket |
| 9 | Compression spring |
| 10 | Locking ring |
| 11 | Outer splines |
| 12 | Piston-cylinder arrangement |
| 13 | Piston rod |
| 13.1 | Piston |
| 14 | Ratchet lever |
| 15 | Cylinder housing |
| 16 | Fluid connector |
| 17 | Pawl |
| 18 | Annular duct |
| 19 | Fluid distributor |
| 20 | Transverse bore |
| 21 | Section |
| 22 | Transverse bore |
| 23 | Fluid duct |
| 24 | Annular chamber |
| 25 | Fluid distributor |
| 26 | Annular duct |
| 27 | Ring body |
| 28 | Annular body/locking bracket |
| 29 | Locking ratchet |
| 30 | Locking chamber |
| 31 | Opening |
| 32 | Locking pawl |
| 33 | Outer splines |
| 34 | Actuating lever |
| 35 | Return lever accommodation |
| 36 | Actuating section |
| 37 | Actuating lever channel |
| 38 | Actuating ring |
| 39 | Return lever accommodation |
| 40 | Actuating rod |
| 41 | Actuating cam |
| 42 | Housing |
| 43 | Handle |
| 44 | Actuating cam recess |
| 45 | Actuating wheel |
| 46 | Drive contour |
| 47 | Outer splines |
| 48 | Output wheel |
| 49 | Teeth |
| 50, 50.1 | Coupling ring |
| 51 | Counter bearing disc |
| 52 | Compression spring |

The invention claimed is:

1. A multiplex bolting tool for multiple bolts or nuts with multiple drive spindles that are arranged around a center and are equipped or able to be equipped at an end with respective torque-applying tools, and a ratchet drive, associated with each drive spindle and driven by means of a hydraulic piston drive, for driving the drive spindles, comprising: an actuator unit for inducing a rotary movement in the drive spindles, the actuator unit having an actuating wheel mounted rotatably about the axis of the center of the annular arrangement of the drive spindles as drive wheel, which drives respective output wheels fitted on the drive spindles, wherein driving movement of the actuating wheel is transmitted to the drive spindles via respective torque limiters.

2. The multiplex bolting tool of claim 1, wherein the output wheels are connected to the drive spindles via a slip coupling for transferring drive force to the drive spindles in a torque-limited manner, and respective gear rings of the output wheels mesh with outer splines of the actuating wheel.

3. The multiplex bolting tool of claim 2, wherein the slip coupling of each drive spindle comprises two coupling discs seated on said drive spindle in a torque-transferring manner, each having a coupling surface inclined relative to the longitudinal extension of the drive spindle, which coupling surfaces are inclined to each other for forming an output wheel accommodation, and also comprises the output wheel, which engages with the output wheel accommodation with its inner side designed complementary to the coupling surfaces and which fits against the coupling surfaces of the coupling discs under preload.

4. The multiplex bolting tool of claim 3, wherein the coupling surfaces are curved in the direction of their inclination.

5. The multiplex bolting tool of claim 3, wherein the preload of the slip coupling is provided by a compression spring acting on one of the coupling discs.

6. The multiplex bolting tool of claim 3, wherein the preload of the slip coupling is adjustable.

7. The multiplex bolting tool of claim 1, wherein the actuating wheel has a drive contour for connecting a drive tool.

8. The multiplex bolting tool of claim 1, further comprising a drive block, wherein the actuator unit is designed such that it can be detachably connected to the drive block and components of the actuator unit are received in a housing with an upper part and a lower part.

9. The multiplex bolting tool of claim 8, wherein the drive spindles are supported and held in the drive block, each drive spindle having a drive section protruding from the drive block at each end, wherein the drive sections of the drive spindles on one side of the drive block serve to bear the torque-applying tools, and the actuator unit is connected to the other drive sections of the drive spindles.

10. The multiplex bolting tool of claim 9, wherein, inside the drive block, pistons of the piston drives are routed in cylinder housings such that said pistons are translationally displaceable in both directions, wherein piston rods of the pistons are each kinematically connected to a ratchet lever for transferring a forward stroke movement and a return stroke movement to the respective ratchet levers with pawls, and wherein the drive block has at least one first fluid distribution cavity in a center area thereof, into which multiple fluid ducts located in the drive block open, said multiple fluid ducts each establish a fluid connection between the at least one first fluid distribution cavity and a first fluid input of one of the cylinder housings, and wherein, on a flat side of the drive block, a fluid distributor with an annular duct connected to a fluid supply duct is arranged as a second fluid distribution cavity, into which multiple fluid ducts open, said multiple fluid ducts each establish a fluid connection between the second fluid distribution cavity and a second fluid input of one of the cylinder housings.

11. The multiplex bolting tool of claim 10, wherein the at least one first fluid distribution cavity located in the center area of the drive block is designed as an annular duct.

12. The multiplex bolting tool of claim 10, wherein the drive block is composed of at least two block discs, wherein multiple ratchet drives are arranged in each block disc.

13. The multiplex bolting tool of claim 10, wherein the at least one first fluid distribution cavity comprises two first fluid distribution cavities, with a first fluid distribution cavity associated with each of the block discs, and fluid connections are established between the two first fluid distribution cavities by another fluid distributor.

14. The multiplex bolting tool of claim 10, wherein the drive spindles bear spring-loaded sockets as the torque-applying tools.

15. The multiplex bolting tool of claim 10, wherein the direction of movement of each piston rod of the ratchet drives is the same as the direction of movement of the respective ratchet lever driven thereby, and the ratchet lever is directly driven by the piston rod.

16. The multiplex bolting tool of claim 10, wherein the direction of movement of each piston rod of the ratchet drives extends at an angle to the direction of movement of the respective ratchet lever driven thereby, and in order to transfer the forward stroke movement and the return stroke movement of the piston rod to the respective ratchet lever, a link is arranged between the piston rod and the ratchet lever such that one end of the link is articulated to the piston rod and the other end of the link is articulated to the ratchet lever.

17. The multiplex bolting tool of claim 10, wherein the link is a lever of a two-bar toggle joint.

18. The multiplex bolting tool of claim 10, wherein the multiplex bolting tool is associated with a hydraulic unit comprising a hydraulic pump, a fluid tank, a fluid pressure output for the forward stroke and a further fluid pressure output for the return stroke, and at least one flow measurement device as well as a control unit for controlling the hydraulic unit, by which control device the hydraulic unit, during operation of the multiplex bolting tool, is switched between a forward stroke conveyance and a return stroke conveyance dependent on a fluid quantity conveyed.

19. The multiplex bolting tool of claim 1, further comprising locking ratchets for locking the drive spindles, each locking ratchet acts on one of the drive spindles, in addition to the ratchet drive, to keep the drive spindle from turning back when the ratchet drive performs a return stroke movement, wherein the locking ratchets are arranged in a locking bracket penetrated by the drive spindles, and the locking bracket has means for loosening the locking ratchets.

20. The multiplex bolting tool of claim 19, wherein each drive spindle opening of the locking bracket comprises a locking chamber in which a locking pawl acting on the drive spindle under spring load is received.

21. The multiplex bolting tool of claim 20, wherein the locking pawl has at least one actuating area facing the drive spindle, against which actuating area a return lever is fitted for moving the locking pawl away from a position in which the locking pawl locks the drive spindle.

22. The multiplex bolting tool of claim 21, wherein the locking pawl has two actuating areas which enclose a middle part supporting teeth of the locking pawl.

23. The multiplex bolting tool of claim 21, wherein each return lever associated with the locking ratchets protrudes with one end into a return lever accommodation of the locking bracket and with its other end protrudes from the locking bracket in the radial direction and engages with a return lever accommodation of an actuating ring which is concentrically rotatable to the locking bracket for displacing the return levers.

24. The multiplex bolting tool of claim 23, wherein the actuating ring is arranged on an inner side of the locking bracket, as seen in the radial direction, and has an actuating cam recess in which an actuating cam is held rotatably relative to the locking bracket for adjusting the actuating ring.

25. The multiplex bolting tool of claim 24, wherein the actuating cam is provided on an actuating rod, which extends in the radial direction and penetrates the locking bracket, with an end of the actuating rod protruding from the locking bracket in the radial direction having a handle.

26. The multiplex bolting tool of claim 23, wherein the return lever has an edge pointing to an actuating area of the locking pawl, starting from which a first bar of the return lever extends to the return lever accommodation of the locking bracket and a second bar of the return lever extends into the return lever accommodation of the actuating ring.

\* \* \* \* \*